Oct. 6, 1964 H. LEVINE 3,151,635
APPARATUS FOR AND METHOD OF CUTTING AND FORMING WIRE SECTIONS
Filed Nov. 10, 1960 6 Sheets-Sheet 1

INVENTOR.
HARVEY LEVINE
BY
William A. Galesak
ATTORNEY

United States Patent Office 3,151,635
Patented Oct. 6, 1964

3,151,635
APPARATUS FOR AND METHOD OF CUTTING
AND FORMING WIRE SECTIONS
Harvey Levine, North Arlington, N.J., assignor to Radio
Corporation of America, a corporation of Delaware
Filed Nov. 10, 1960, Ser. No. 68,554
22 Claims. (Cl. 140—71)

This invention relates to an apparatus and a method for accurately cutting and forming a continuous wire having distinctively formed or shaped portions separated by lengths of differently formed portions, into cut-off pieces in which the distinctly formed portion is centered between equal lengths of differently formed portions.

In a particular application thereof, this invention relates to apparatus and method for accurately cutting and forming individual heaters from a continuous heater wire which has been wound on a mandrel in the form of separate helical portions wound at 100 to 400 turns per inch, separated by skip lengths or portions of wire wound at 10 to 20 turns per inch. The completed individual heaters are of V-shape with the helically wound portion centered at the apex of the V and with the legs of the heater comprising equal lengths of the skip portions of the heater wire.

It is presently possible to wind the helically wound portions of the continuous heater wire accurately and uniformly within one thousandth of an inch, but it has been difficult to produce equal length skip portions of the heater wire between the helical portions of the equal lengths. Due to such inaccurate skip portions, and also due to accumulation of errors (though small) in the helical portions, machine fabrication of heaters from the continuous heater wire was heretofore impractical. Until the present invention, therefore, accurately formed V-shaped heaters with centered helical portions and with equal length legs formed from the skip length portions of wire were manually produced by skilled operators.

It is an object of this invention to provide a novel apparatus and method for accurately cutting and forming individual pieces of wire having distinctively formed portions centered along the length of the cut and formed piece and having equal lengths of differently formed portions comprising legs for the cut and formed piece.

It is an object of this invention to provide a novel apparatus and method for accurately cutting and forming individual cathode heaters from a continuous heater wire, and more particularly from a continuous heater wire having equal length helically wound portions separated by skip portions.

It is another object of my invention to provide a method and an apparatus for producing heaters of V-shape having an evenly distributed helical portion with respect to the apex thereof and having equal length legs of skip wire.

It is a further object of my invention to provide a novel method and an apparatus for cutting heater wire having helically wound portions separated by skip lengths into pieces such that the helical portion will be centered between skip portions of equal length.

It is a further object of my invention to provide a novel method and apparatus for bending the so-cut heater wire into a V-shape with the apex of the V in the middle of the helical portion of the cut heater wire.

In accordance with my invention, a continuous wire formed of equal lengths of distinctively formed portions separated by differently formed portions of varied lengths, is taken off a spool where it is stored, fed through a means for detecting the end of the distinctively formed portion or the juncture of the distinctively formed portion and the differently formed portion. The wire is fed through the detector means until the said end or juncture is detected and then the detector causes the feeding means to cease further feeding of the continuous wire. The leading differently formed portion is then gripped and the continuous wire is pulled a predetermined distance off the spool and between two cutters. The cutters are so arranged with respect to the gripping and pulling means that the distinctively formed portion of the continuous wire is centered between the cutters. This centering results from the fact that the distinctively formed portions of the wire are all of substantially the same length and the gripping and pulling means grips and pulls the wire only after the end of the distinctively formed portion of the wire is accurately positioned by action of the detector means. Just before the wires are cut, the gripping means releases the heater wire and immediately after cutting, a pair of oppositely disposed pivoted arms engage and then push the so-cut piece of wire against the edge of a centrally located knife-shaped anvil or forming tool. The pivoted arms of the pushing means approach the sides of the anvil as the arms go by it. In this manner, the cut portion is formed into a V having the apex thereof centrally located in the distinctively formed portion thereof and having differently formed portion legs of equal lengths. The pivoted arms of the pushing means then recede from the anvil and move away from each other releasing the V-shaped formed piece of wire and dropping it into a bin. This ends the cycle of my machine.

In a particular application of this invention, individual heaters are produced from a continuous heater wire. The distinctly formed portions of the continuous heater wire comprises helical portions thereof wound at 100 to 400 turns per inch and the differently formed portions comprise skip or leg portions wound at 10 to 20 turns per inch on a mandrel. The individual heaters produced by this machine are V-shaped, the apex of the V being at the middle of the helical portions and the equal length legs of the heaters comprising the skip or leg portions.

My invention is described in greater detail in connection with the accompanying drawings in which.

Figure 1:
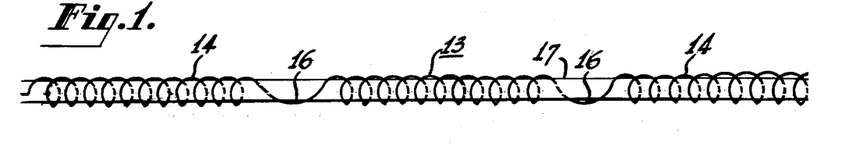
FIG. 1 shows a continuous heater wire with substantially uniform helical portions and skip portions of varied length therebetween and wound on a mandrel.

Turning to FIG. 1, the heater wire 13 comprises substantially identical helically wound portions 14 connected by relatively straight skip wound portions 16 wound on mandrel 17. Due to manufacturing difficulties, the skip portions 16 are of differing lengths. It is due to the differing lengths of the portions 16 and to cumulative errors in the lengths of helical portions 14 that such heater wire does not lend itself to fabrication or manipulation by presently known machines to produce accurate separate heaters.

A general description of my device for producing accurately formed heaters from such heater wire and the operation of this device will be given in connection with FIGS. 2 and 2a through 2e.

Figure 2:
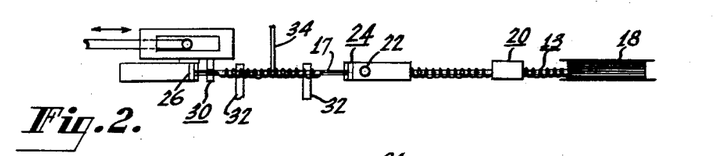
FIG. 2 is a simplified diagrammatic plan view of an apparatus embodying my invention.
Figure 2A:
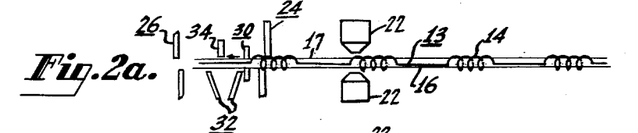
FIGS. 2a through 2e are simplified diagrams of parts of the apparatus made according to my invention and illustrating the detecting, pulling, cutting and bending operations thereof.
Figure 2B:
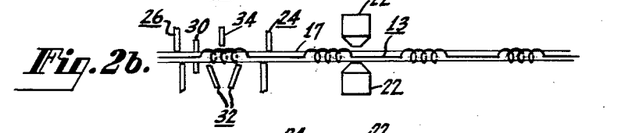
Figure 2C:
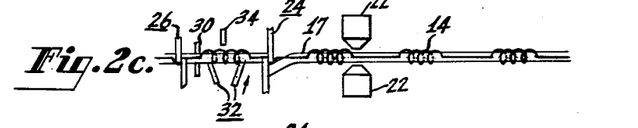
Figure 2D:
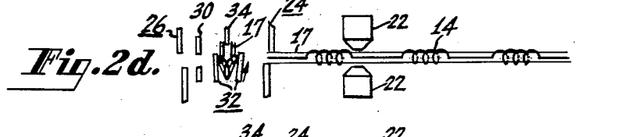
Figure 2E:
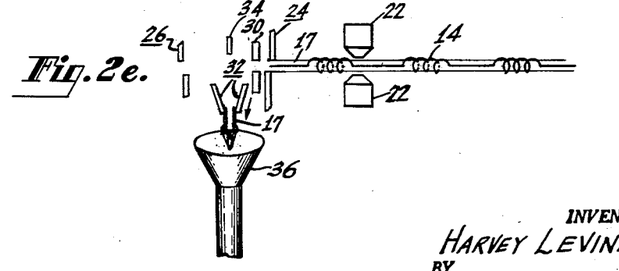

In general, wire 13 of the form shown in FIG. 1, on its mandrel 17, which is wound on a spool or a reel 18, is fed by a feeding device 20 through a detector 22 in the direction of cutting jaws 24 and 26. The feeding is initiated by a cam means to be described. After the feeding has been started, it continues and ceases only when the detector 22 senses a juncture of a formed and a skip portion of the heater wire, as shown in FIG. 2a. At the time that the feeder device 20 ceases to operate, gripping jaws 30 grip a skip portion of the heater wire and pull the heater wire to the left, as shown in FIG. 2a, for a predetermined distance and between right-hand and left-hand cut-off jaws 24 and 26. At this time (see FIG. 2b), the formed portion of the heater wire 13 is centered between these two sets of cut-off blades, and with an equal length of skip wire extending from each end of the formed wire towards the right and the left-hand cutter blades, Then the cutters 24, 26 cut off the heater wire; the gripping means 30 having released the cut-off portion of the heater wire just before the cutting takes place. The forming jaws 32 have been moving upwards and at the moment of cutting, they support the cut off portion of heater wire. This is shown in FIG. 2c. The forming jaws 32 continue to move upwards, pushing the center of the heater wire against anvil 34. Also, as the forming jaws move upwardly and bend the heater wire about the anvil 34, the forming jaws 32 turn towards each other thereby pushing the outlying parts of the heater wire toward the anvil and completing the bending thereof into V-shape. This is shown in FIG. 2d. Then the forming jaws 34 go downward and as they go downward they rotate away from each other whereby the formed heater is no longer supported and it falls into the funnel 36, as shown in FIG. 2e. In the meantime the open gripping jaws 30 are moved to their extreme right-hand position, and the cycle is completed. In each operation, the mandrel 17 is fed, cut and bent along with the heater wire wound thereon.

The various portions of my machine, described generally above are described in greater detail in connection with FIGS. 3 to 12 to which reference is now made. The reference characters therein are the same as the reference characters used hereinabove with added ones, as needed.

Figure 3:
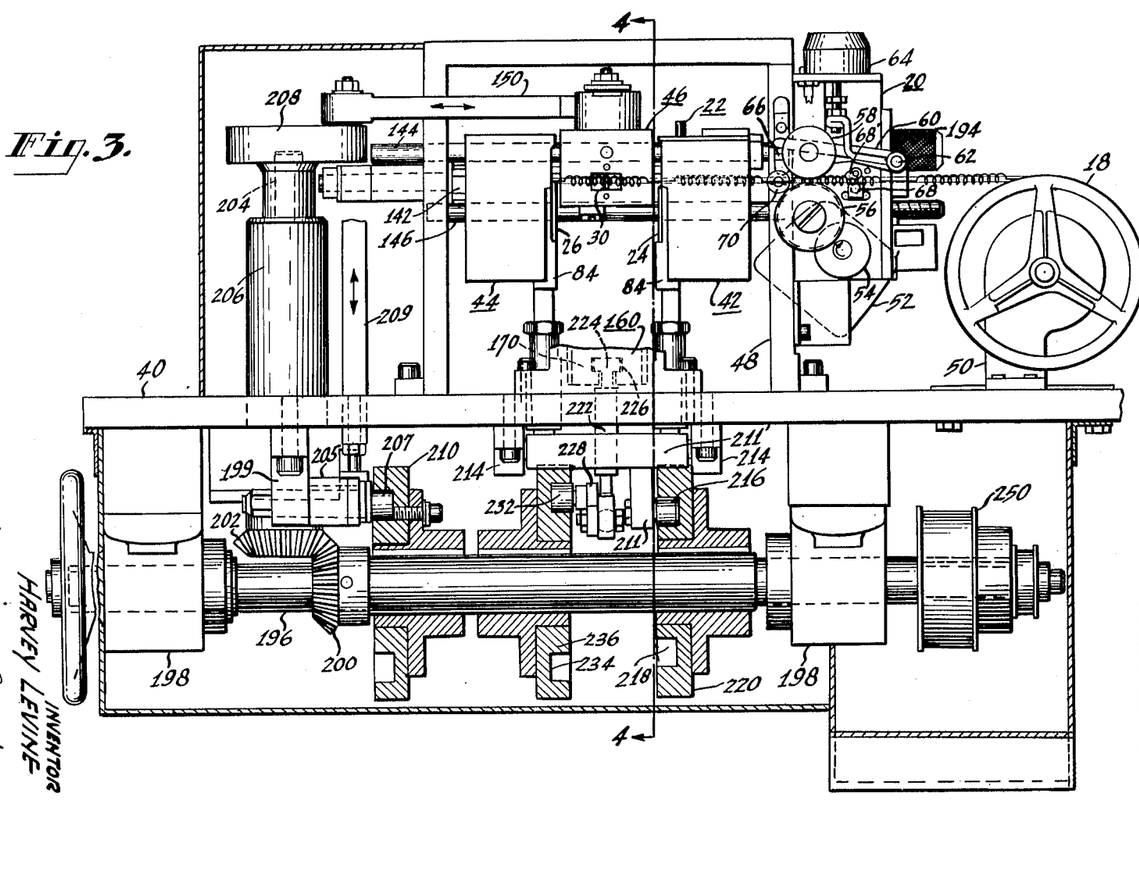
FIG. 3 is a side elevation, partly in section, and partly broken away of my cutting and forming machine.
Figure 4:
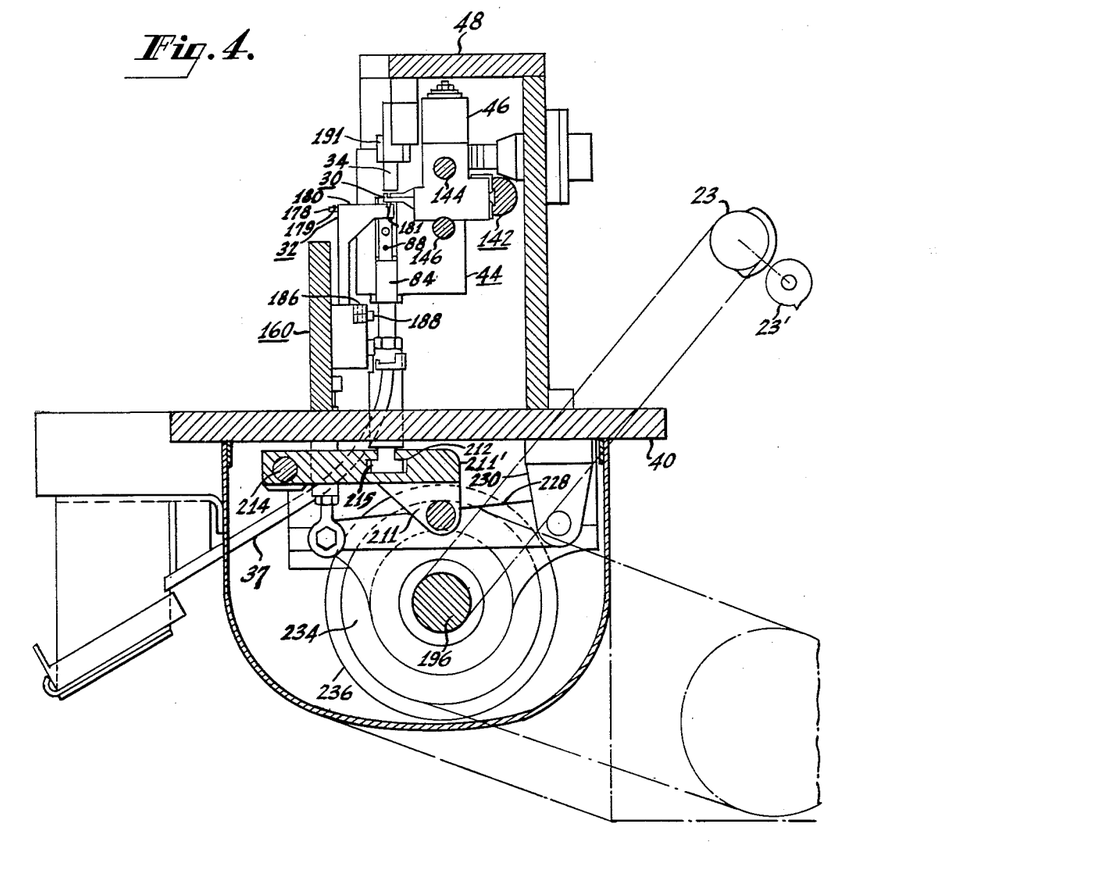
FIG. 4 is a section of my machine taken along lines 4—4 of FIG. 3.

Turning to FIGS. 3 and 4, a table 40 is provided on one end of which is mounted the wire supply spool or reel 18. The feeder means 20 is mounted on the table to the left of the spool 18 and in such a position that wire from spool 18 may be strung therethrough. The right-hand cutter blade housing 42 and the similar left-hand cutting blade housing 44 are spaced apart and to the left of feeder means 20 on the table and in the line of feeding of the heater wire. The detector 22 is fitted into the right-hand housing 42, as further explained below. The gripping jaw housing 46 is so mounted that the gripping jaws 30 move in the space between the cutting blade housings 42 and 44. The forming jaws 32, which are broken away in FIG. 3, are mounted to move up and down between the cutting blade housings 42 and 44. This is better shown in FIG. 4. A supporting housing 48, whose function will be made clear below, is also supported on table 40 and partially surrounds the cutting jaw housing 42 and 44 and the gripper housing 46.

The spool 18 on which heater wire 13 is stored is rotatably supported on the right-end of table 40 by means of spool support 50. The heater wire 13 is fed from the spool 18 to wire feeder assembly 20 (see FIG. 3) which comprises a motor 52 continuously operating in clockwise direction, driving, by means of its gear wheel 54, the feed wheel 56 (which may be of steel or may be rubber-faced) in a counter-clockwise direction. A rubber-faced feed wheel 58 is mounted for free rotation on a lever 60 which is pivoted on the wire feeder housing at 62. The lever 60 is urged upwards by a spring means (not shown) and is urged downward by the solenoid 64. A stop means 66 is mounted on supporting housing or frame 48, and cooperates with the end of lever 60 to prevent the said feed-wheel 58, upon actuation of solenoid 64 from passing against the feed wheel 56 so hard as to injure the heater wire which runs therebetween.

Stop means 68 is provided between reel 18 and feed wheels 56 and 58 to prevent the heater wire from moving back towards the reel 18 due to the resiliency of the heater wire. As shown, stop means 68 comprises a forwardly directed dog 68' bearing on an adjustably positioned anvil. A guide 70 mounted on housing 48 is provided between the wire feeder 20 and the right-hand jaw housing 42.

Figure 7:
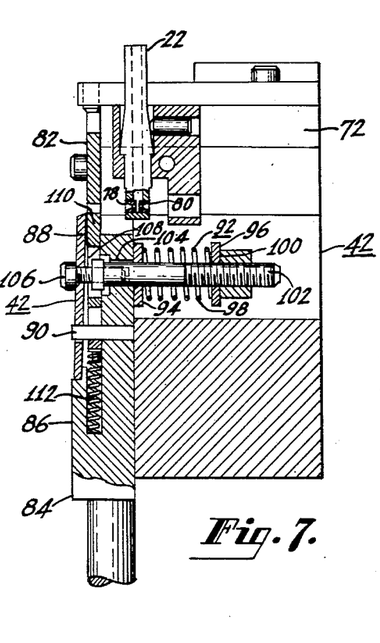
FIG. 7 shows the right hand wire cutting jaw housings of my machine in section on line 7—7 of FIG. 8 to show the details thereof and also showing the detecting means.
Figure 8:
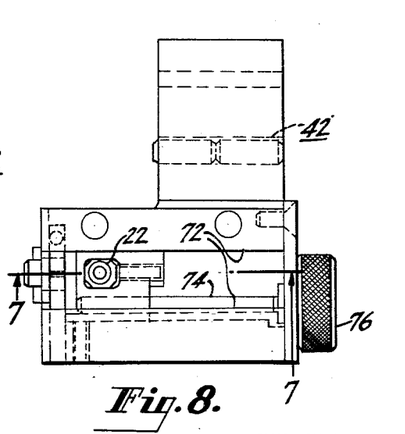
FIG. 8 is a plan view of the right hand wire cutting jaw housing of FIG. 7.

The wire 13, which is fed by wire feeder 20, is fed through the right-hand jaw housing and detector 42, shown in FIG. 3 and shown in more detail in FIGS. 7 and 8. As shown in FIGS. 7 and 8, the right-hand jaw housing 42 has a slot 72 in the upper part thereof extending parallel to the path of movement of the wire. The detector 22 is mounted on an adjustable carrier. This carrier which slides in the slot 72 is adjusted by a screw 74 which is turned by a knurled adjusting nut 76. Turning of this nut moves the carrier and therfore the detector 22 along slots 72. The detector 22 itself comprises a tube having oppositely directed nozzles or metering holes 78 and 80 in the lower end thereof. Air is blown into the tube and out through the nozzles and the wire 13 which extends through said nozzles constricts the air flow out of said nozzles more or less depending on whether the formed or the unformed portion of the wire 13 obstructs the nozzles. As further explained below, the change in back pressure resulting from this change in obstruction of the nozzles is used to cause the turning on or off of the feeding means 20.

Except for the presence of detector 22, the right-hand and the left-hand jaw housings 42 and 44 and cutters 24 and 26 are similar. Therefore, only the right-hand cutter means 42 is shown and it will be described in detail.

Referring to FIG. 7, the housings 42 and 44 have holding and cutting means mounted on facing sides thereof. Considering the right-hand cutter, the cutters include a stationary knife 82 fastened to the inward or left face of the right-hand cutter jaw housing 42 as by bolts in a known manner. The cooperating movable cutter includes the cutting jaw 84 dove-tailed at its upper end 86 into the inner face of the jaw housing 42 to slide therein. The upper portion 86 carries a cutter blade 88. A pin 90 fixed in the upper end portion 86 extends through cutter blade 88. This blade 88 is urged laterally towards stationary blade 82 by the spring-pressed means 92. The spring-pressed means 92 comprises a pair of washers 94 and 96 with a compression spring 98 therebetween. The right-hand washer 96 rests against the shoulder 100 on a nut threaded on screw 102. The screw 102 extends through an enlarged hole 104 in the upper end portion 86. The left-hand washer 94 encompasses said hole 104. The shank of headed screw 106 fits through a hole 108 in movable cutter blade 88 and into screw 102. A slide 110 is fitted between the blade 88 and a lateral part of the upper end portion 86 of the cutting jaw. It is urged upwards by a spring 112 seated in a vertically positioned hole in the upper portion 86. This slide has slots therein, clearing pin 90 and spring-pressed means 92, to permit spring 112 to press slide 110 against the edge of upper or stationary knife 82. The slide 110 and the upper blade 82 cooperate to form a clamp whereby the unformed portion of the heater wire is held while the knife blades cooperate to cut the wire. Upon downward movement of the upper portion 86, as will be explained below, the slide 110 is pulled downward until an opening appears between the slide 110 and the upper blade 82, as shown in FIG. 7, to permit both unformed and helical heater wire to pass by the cutters. As noted, the cutters and slide holder arrangement on the right face of the left-hand cutter jaw housing 44 is similar to those already described and they are therefore not shown nor specifically described.

Figure 5:
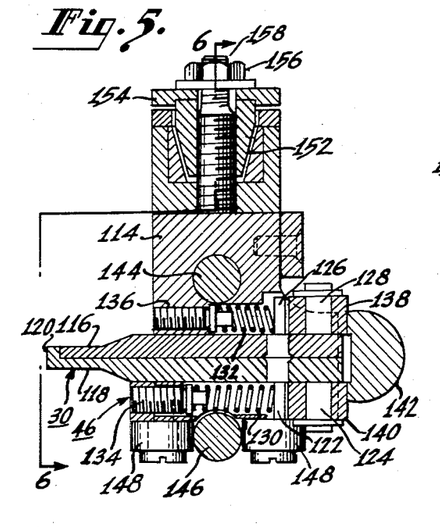
FIG. 5 is a vertical section of the heater wire gripping head of the machine taken along lines 5—5 of FIG. 6.
Figure 6:
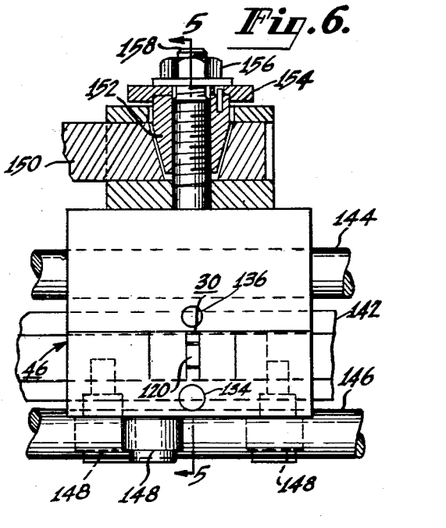
FIG. 6 is a front elevation view of the gripping head of my machine partly in section taken along the line 6—6 of FIG. 5.

The clamping or gripping housing assembly designated generally at 46 of FIG. 3 is shown in greater detail in FIGS. 5 and 6. This assembly comprises a body portion 114 having an elongated opening extending therethrough and receiving therein slidably mounted clamping members 116 and 118. The lower clamping member 118 is provided at one end with an upwardly turned portion 120. Clamping members 116 and 118 together with the up-turned portion 120 comprises the gripping jaws 30. The other end of gripping member 118 has extending downwardly therefrom and attached thereto the two pin members 122 and 124. The upper clamping jaw 116 is provided with upwardly extending pins 126 and 128. The clamping members are biased toward the right by means of compression springs 130 and 132 mounted within the housing and received between the pins 122 and 126 and the stop members 134 and 136. The pin 128 fixed to the upper slide is provided with a rotary cam follower 138. The lower clamping jaw is provided with a rotary cam follower 140 rotatably mounted on pin 124. These followers are engaged by a rotatable cam member 142, which, upon rotation, engages either follower 138 or follower 140 to urge the respective clamping member 116 or 118 against either the biasing spring 132 or biasing spring 130. Upon proper rotation of the member 142, the clamping jaws may be opened or closed as desired.

The clamping or gripping assembly 46 is slidably mounted on table 40 by means of rods 144 and 146 which extends through and are supported by housing 48. The upper of these rods 144 extends through the body portion 114 of the clamping assembly 46 and the lower rod extends under this clamping assembly and between rollers 148 of which three are provided. The clamping assembly is moved along the rods 144 and 146 by rod 150 (FIGS. 3 and 6). The cam 142, mentioned above, is positioned so that it extends along the path of travel of the gripping assembly 46 for cooperation with cam followers 138 and 140.

A lost motion means is provided between rod 150 and the clamping assembly 46 for a purpose to be described. The lost motion means comprises a conical hole in the rod 150 and a cooperating conical nut 152. The conical nut is threaded on bolt 158 which is mounted in the top of the body portion 114. The conical nut is raised or lowered by knurled nut 154 fastened to the conical nut 152 as by a pin means. Thereby, upon turning the knurled nut 154, the space between the conical nut and the inside of the conical hole in the end of rod 150 may be adjusted. No motion of the clamping or gripping assembly 46 takes place until the said space is taken up. To preserve the adjustment of the conical nut 152, a further nut 156 is provided on bolt 158. Upon tightening of this nut 156, the knurled nut 154 is locked.

Figure 9:
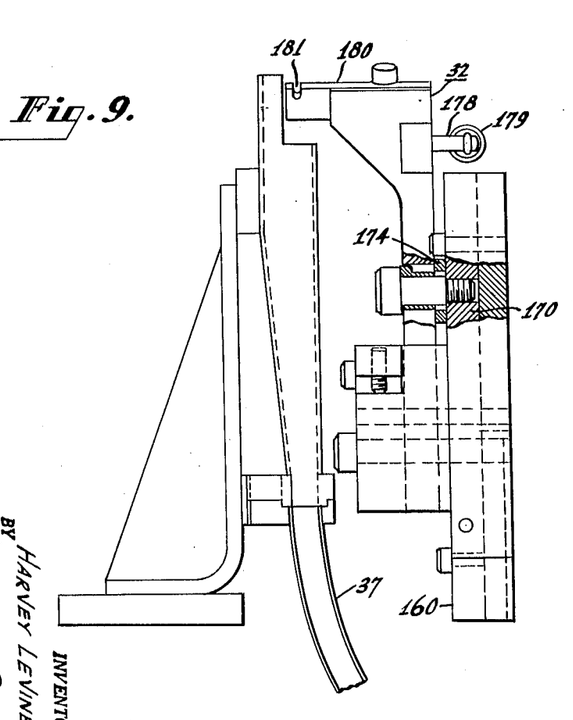
FIG. 9 is an end elevation view partly broken away of the heater forming means of my machine and also showing the funnel for receiving completed heaters.
Figure 10:
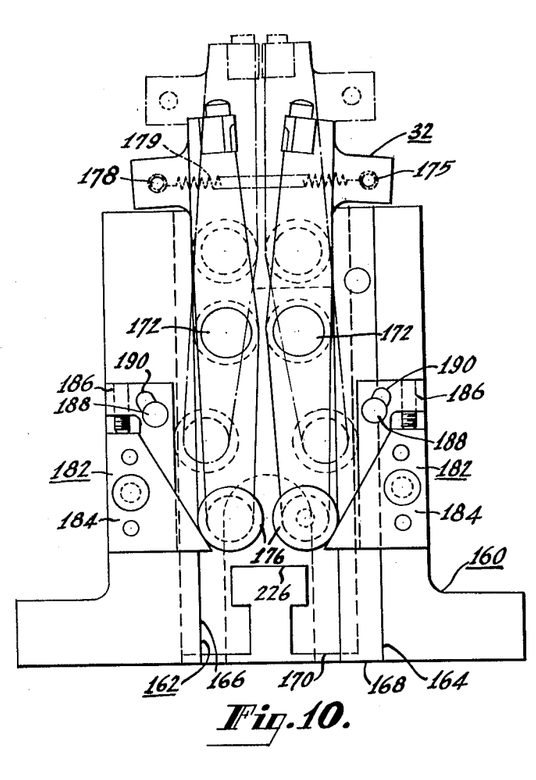
FIG. 10 is a side elevation view of the heater forming means of FIG. 9.

The means for forming the cut-off heater to V-shape, generally indicated at 32 in FIGS. 2 and 2a–2e, will now be described. Turning first to FIGS. 3 and 4, upstanding support 160 is fixed to table 40 by any suitable means in a position between right and left-hand cutting jaw members 42 and 44. The upstanding support 160 is broken away in FIG. 3 to permit the parts behind it to be seen. Turning now to FIGS. 9 and 10, upstanding support 160 has longitudinal slot or slide guideway 162 formed therein. One edge 164 of the slot is square and the other edge is cut to form a dove-tail 166. A spacer 168 fits the rectangular end of the slot to complete the dove-tail. A slide 170 slides in the dove-tail slot in the upstanding support 160. The slide 170 carries a pair of forming jaws 32 each pivoted at 172 on the slide 170. The forming jaws 32 are spaced from the slide by the washers 174. The forming jaws are related as the left and right-hand and the following explanation is to be read with this feature in mind. The lower ends of pivoted jaws 32 carry rotary cam followers 176, extending in a direction perpendicular to and away from the support 160. The upper end of the forming jaws each has a pin 178 extending perpendicular thereto in the direction opposite the cam followers. A spring 179 stretches between pins 178 and urges the lower ends of the jaws 32, and, therefore, the cams 176 on the jaws, apart. The forming jaws 32 have fixed to the sides thereof, opposite the pins 178, a projecting portion 180, each fixed to its jaw 32 in a known manner. The upper and outer end of the projecting portion 180 has a groove 181 on the top thereof for the purpose of contacting and holding the helical portion of the heater wire as will be explained below. Mounted on the upright support 160 for cooperation with the cam follower 176, are cam means 182 each comprising fixed wedge-shaped portion 184 and an L-shaped adjustable cam portion 186. One leg of the L is parallel to the direction of motion of the slide. The adjustable portion is fixed to the support 160 by a bolt 188 extending through a slanting slot 190 in the cam portion 186 so that as the cam portion 186 moves up and down on upright support 160, the cam portion also moves in and out. By this adjustment, the distance between the two cam portions 186 may be controlled. At the lower end of travel of the slide 170, the projections 180 on the forming jaws 32 are furthest apart and they approach each other to an adjustable minimum distance while the slide 170 moves upwards as shown in dotted lines in FIG. 10.

Turning again to FIG. 4, a stationary knife-like forming blade or anvil 34 is supported from the top part of the main housing 48 at a point half-way between the cutting members 24 and 26 and just above the gripping or clamping jaws 30. This support comprises any suitable position adjusting means 191. Its use in conjunction with the forming jaws 32 was described above in connection with FIGS. 2a–2e.

Means are provided to cause proper motions of the gripping assembly 46 and the cutter blade holders 84 and the wire forming jaws 32, and to rock cam 142 about its longitudinal axis. These means are shown in FIGS. 3 and 4 and include in common the shaft 196 mounted below table 40 in bearings 198.

The means for moving the gripper housing 46 comprises beveled gear 200 mounted on shaft 196 and meshing with bevel gear 202 to rotate vertical shaft 204 which is mounted in vertical bearing 206. Crank 208 is mounted at the upper end of shaft 204 and crank arm or rod 150 is pivoted thereon, the other end of said crank or rod, as noted above, being fastened to the gripper housing lost motion means. Therefore, upon rotation of shaft 196, the gripper jaw housing 46 moves from its left to its right extreme positions between cutter blade housings 42 and 44. The cutter blade housings 42 and 44 are L-shaped to permit such motion. The shape of housing 42 is illustrated in FIG. 8. Due to the lost motion means described above, the housing 46 is stationary for a small period of time at each end of its travel.

Means are provided for causing cam 142 to oscillate about its axis for the purpose of operating gripping jaws 30. This means comprises a vertically reciprocating shaft 209 connected by a well-known lever means (not shown) to oscillate said cam 142. This shaft 209 is mounted on lever 205 which is pivoted in bearing 199, which in turn is mounted below table 40. The lever 205 also comprises pin 207 which fits in a slot in cam 210. This cam 210 is mounted for rotation with shaft 196, and as the shaft rotates, the horizontal cam 142, due to its linkage, is caused to oscillate about its horizontal axis.

The means for causing the right and left-hand cutter blade holders to move upwardly and downwardly comprises lever 211' having T-shaped slots 212 (FIG. 4) therein and being pivoted in bearings 214 mounted on base 40. The lower ends of blade holders 84 are headed, as shown at 215, and are fitted into the T-shaped slots 212, so that as the positions of the cutter housings 42 and 44 are adjusted (as explained below), the cutter blade housings may slide in the T-shaped slot 212. The lever 211' has a downwardly extending portion 211 on which is mounted a cam follower 216 which is fitted into the slot 218 of cam 220. Cam 220 is mounted for rotation with shaft 196, whereby, as shaft 196 rotates, right and left-hand cutter jaw holders 84 move up and down in accordance with the shape of the cam slot, as is more fully described below.

The means for moving slider 170 in slot 162 in upstanding support 160 comprises a shaft 222 which has its upper end formed into T-shape 224 and which fits into a similarly formed slot 226 in slider 170. The lower end of shaft 222 is pivoted on lever 228 which is mounted under table 40 on bearings 230 (FIG. 4). This lever has a cam follower 232 mounted at the side thereof, which fits into slot 234 and cam 236. The cam 236 is mounted for rotation with shaft 196 whereby slide 170 is moved up and down in accordance with the shape of the cam 236.

The shaft 196 is rotated by means of a belt drive using a stepped pulley 250. The timing cams 23 and 23' (FIGS. 4 and 11) are belt-driven from a step of the step pulley 250, and, as explained above, starts the feeding of a heater wire.

Since different lengths of heaters may be made from time to time, means are provided to move the right and left-hand cutter jaw assembly 42 and 44 towards and away from each other. This means, shown in FIG. 3, comprises the two rods 144 and 146, which are slidably but not rotatably mounted in main housing 48. The right-hand assembly 42 is fastened to move laterally with rod 144 but it freely slides on rod 146. Conversely, the left-hand assembly 44 is fastened to move with rod 146 but it slides freely on rod 144. The nut 194 is threaded on rod 144 and is mounted on frame 48 to permit rotation of nut 194 but to prevent axial motion with respect thereto. Therefore, the rotation of nut 194 causes assembly 42 to move along the direction of the axis of rod 144. Similarly, another nut (not shown) similar to nut 194 is provided for threaded rod 146 to move left-hand housing 144 axially of rod 146. These two nuts may be geared together by means (not shown) so that upon turning nut 194 in one direction, the two housings approach each other and upon turning the nut 194 in the opposite direction, the two housings recede from each other.

Figure 11:
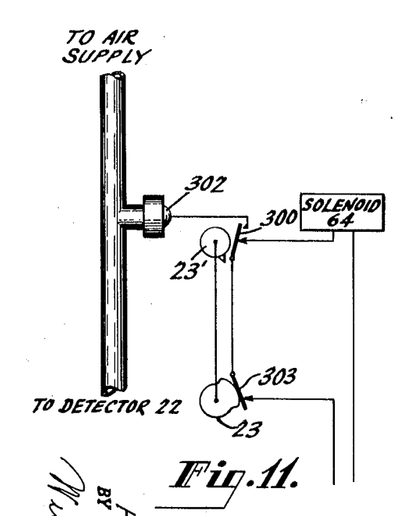
FIG. 11 is a diagrammatic showing of the electrical switching means for the heater wire feeding means.

FIG. 11 is a circuit diagram showing the operation of the solenoid 64 and therefore of the heater wire feeding means 20. The air supply tube for the detector 22 opens an over-center snap switch 300 by means of pressure responsive diaphragm 302. Another switch 303 is operated by the cam timer at 23. The two switches are connected between the supply of electricity and the solenoid 64 in a series manner. The over-center snap switch 300 is snapped to its closed position at the beginning of each cycle by cam 23', which is rotated at the same rate as cam 23.

Figure 12:
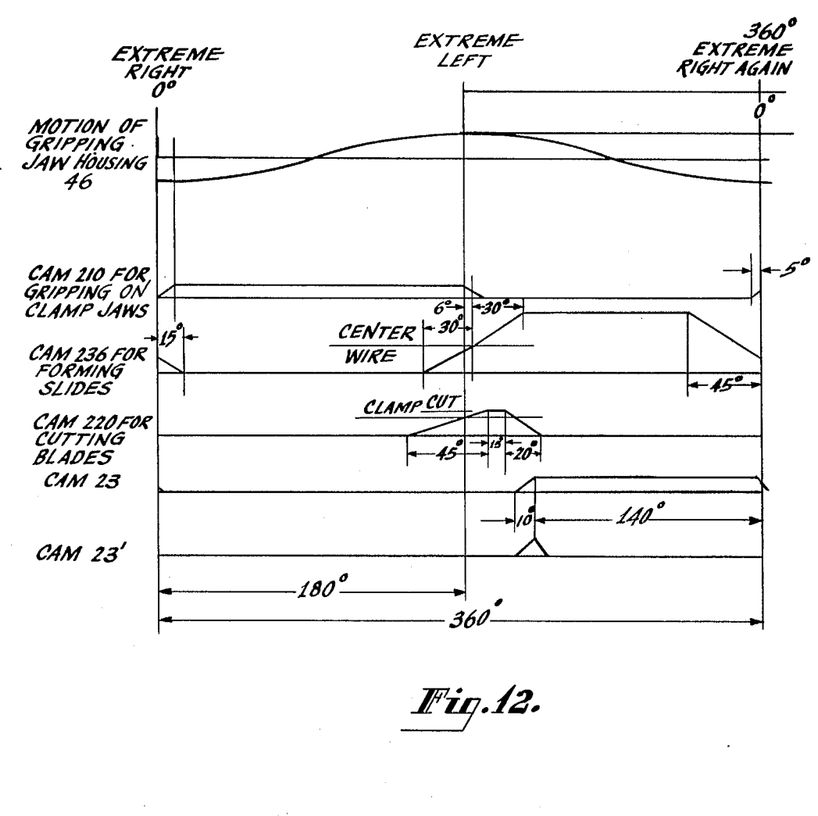
FIG. 12 is a diagram indicating the profiles of the cams and the relative positions of the cams and of the wire gripping means of my machine.

FIG. 12 is a diagram used in explaining the operation of my device and shows broadly the relative motion of the gripping jaw housing 46 and the shapes of the cam faces of cams 210, 236, 220, 23 and 23', and their relative positioning. This figure and FIG. 11 will be referred to in the more detailed explanation of the operation of my device which follows. This explanation applies particularly to the detailed views of FIGS. 3–10.

The heater wire, as shown in FIG. 1 is wound continuously on reel 18 and the end thereof is threaded through the stop 68 and between the feed wheels 56 and 58 and through the guide 70, through the nozzles 80, 78 of the detector 22 and between the blades of the right-hand cutter 24. The motor 52 rotates continuously driving feed wheel 56 continuously but since feed wheel 58 is in its upper position, as shown in FIG. 3, the heater wire is not fed. The main drive motor is started, causing shaft 196 to rotate by means of pulley 250. The cam 23 closes its switch 303 (see FIG. 11) and cam 23' closes over center snap switch 300. This closing of switch 300 takes place only at the beginning of a cycle. Thereby the solenoid 64 is energized to cause lever 60 to rotate counterclockwise until stopped by stop 66. As indicated by FIGS. 11 and 12, the cam 23 keeps switch 303 closed for almost a half revolution of this cam. Upon energization of solenoid 64, feed wheels 56 and 58 cooperate to feed heater wire to the left until juncture of helical heater wire and unformed heater wire arrives at the detector. At this point, the obstruction to the air flow through metering means 78, 80 is reduced and herefore the air pressure reduces. Thereupon, the diaphragm 302 relaxes, and the switch 300 is snapped to its open position and solenoid 64 is deenergized whereby feed wheel 58 is raised by the spring-operated lever 60 and feeding of heater wire ceases. Once the over-center switch 300 has been moved to its open position, detector 22 cannot have any effect on the solenoid 64, until switch 300 is closed by cam 23' at the beginning of the next cycle. Upon opening of switch 300, neither detecting means 22 nor cam 23 can have any effect on wire feeding, and during the rest of the cycle all wire feeding is by the gripping and pulling means 46 only.

Meanwhile, the shaft 196 continues to rotate and the gripping jaw housing 46 is moved to the right by means of beveled gears 200 and 202 and vertical shaft 204, crank arm 208 and upper link 150, which is connected to gripping jaw housing 46. The gripping jaws 30 are open during this motion of gripping jaw housing 46 to the right, since cam 142 is turned clockwise (as seen in FIG. 4) by means of cam 210, lever 205 and vertical shaft 209. As noted above, there is lost motion in the means holding the link 150 to the grasping jaw housing 46 whereby, as indicated in FIG. 12, the grasping jaw housing stays in its extreme right position for a portion of the cycle of my machine. During this portion of a cycle, the cam 142 is rotated counter-clockwise and the gripping jaws 30 close on an unformed portion of the heater wire projecting to the left of cutters 24. The gripping jaw housing moves to its extreme left, pulling the heater wire with it, and comes to a stop there where the jaws 30 immediately release the heater wire. This heater wire, however, is held between slide 110 and upper cutting blade 82 in each cutter jaw housing. The cutting blades 88, 88 are raised by means of cam 220, lever 211', and right and left-hand cutter jaw members 84, cutting the skip parts 16 of the heater wire projecting between right and left-hand cutting jaws 24 and 26. At this point, the helix portion 14 is centered between these cutters and therefore the skip portions 16 are of equal lengths and are also centered between these cutters. The cam 236 pushes slide 170 upward by means of lever 228, and the slide 170 carries right and left-hand forming jaws 32 upwards. The notches 181 in lateral projections 180 on forming jaws 32 contact the helical portion 14 of the heater wire and engage it between turns just as the heater wire is severed by the cutting jaws. As the slide 170 continues to go upward, the upper ends of forming arms 32 approach each other due to the cooperation of spring 179 and cam means 182 as shown in dotted lines in FIG. 10. However, the middle of helical portion 14 of the heater wire 13 is held down by the knife-like forming tool or anvil 34. This action results in bending the heating wire into a V. The slide 170 then goes down taking with it the forming arms 32 which recede from each other near the lower end of motion of the slide 170 due to the cam means 182. This action releases the V-shaped heater which falls through tube 37 into a storage means. The cycle is over and another cycle starts immediately.

It would be understood that the timing of the cams and the relative motion of the grasping jaw housing is exemplary only and may be adjusted for most efficient operation.

The detector 22 may be adjusted so that the diaphragm 302 does not open the switch 300 unless both nozzles 78, 80 are clear of helical portions of the heater wire. In this case, a skip portion only as long as the distance between the adjacent ends of nozzle 78 and 80 will not cause the detector to deenergize the solenoid 64 and stop the feeding of heater wires while a long skip portion would cause stoppage of feeding. Such an adjustment of the detector would result in the formation of heaters with short skip portions along the lengths thereof.

While I have shown my switch 300 opened in response to decreased air pressure in detector 22, if desired, this switch may be opened upon increase of air pressure in the detector 22. In that case, the feeding by feeder 20 will cease as soon as a nozzle or both (depending on the adjustment thereof) is constricted by the helically wound portion of the detector wire. In either case, upon proper adjustment thereof, my machine will produce accurately cut and shaped heaters.

While the detector means is shown as an air pressure responsive type, it is clear that other types of detectors may be used. For example, photoelectric means in which a light beam is more or less prevented from shining on a photoelectric cell, respectively, by a helical or skip portion of the heater wire, may be used. Similarly, detectors comprising feeler means which are raised by the helical portion and allowed to fall by the skip portion of the heater wire may be used.

Furthermore, the wire may have distinctive points along the lengths thereof that are detectable by a detector other than the juncture of the formed and the skip portion. For example, the wire may have points or portions of greater or less reflectivity along the lengths thereof. Such points would be detectable by a photoeletcric cell responsive to reflected light from the wire and more or less responsive to the point or portion of greater or less reflectivity along the lengths of said wire to stop further feeding of said wire.

It will be understood that for heavier gauge wire, which is self supporting in coil form, the mandrel will be unnecessary and the method and apparatus of this invention may be applied to the wire itself and unsupported by a mandrel.

What is claimed is:

1. In a wire feeding and processing apparatus, the combination of a wire processing means positioned along a path, means to feed wire along said path, said wire having distinguishing characteristics along the length thereof, means to cause cessation of feeding of said wire in response to one of said characteristics, means to pull said wire a predetermined distance along said path after cessation of feeding thereof for centering said wire along said path with respect to said wire processing means, and means for actuating said wire processing means after said wire is pulled.

2. Means for intermittently moving and processing a continuous wire comprising distinctively formed portions joined by skip portions comprising a wire processing means positioned along a path, means for feeding said wire past a point in said path, means at said point for detecting the juncture of said distinctively formed portions, said skip portions and means responsive to said detecting means to cause cessation of said feeding upon arrival of said juncture at said joint, and means to pull said wire a predetermined distance along said path after cessation of feeding thereof for centering said wire along said path with respect to said wire processing means, and means for actuating said wire processing means after said wire is pulled.

3. Means for feeding and cutting continuous wire which comprises means for feeding wire having distinguishing characteristics along the length thereof, means to cause cessation of feeding of said wire in response to one of said characteristics, cutting means arranged at different points along a path, means for gripping a portion of said wire and means including said gripping means for moving said wire a predetermined distance along said path and through said cutting means after cessation of feeding of said wire, and means for actuating said cutting means after said wire is pulled.

4. Means for cutting and forming continuous wire comprising a pair of cutter means arranged to cut wire at different points along a predetermined path, clamping means operably associated with each of said cuting means for holding said wire during cutting thereof, a stationary anvil placed along said path and centrally between said points, means arranged between said points for pushing said cut wire against said stationary anvil, said means for pushing comprising a pair of arms, and means for rotating said arms towards each other as they push said cut wire against said anvil.

5. A wire feeding, cutting and bending means, said wire having points of distinctive characteristics along the length thereof comprising means for initiating the feeding of said wire along a path, means to detect the passage of distinctive points of said wire along said path, means responsive to said detecting means to cause cessation of said feeding, means for cutting said wire substantially simultaneously at two points along said path, means to grip said wire, means including said gripping means to pull said wire a predetermnied distance further along said path for centering the wire between said wire cutting means, means for actuating said cutting means after said wire is pulled, and means for bending the cut wire.

6. In a machine for obtaining lengths of wire having centrally located formed portions from a continuous wire having formed and skip portions comprising means for detecting the juncture of said formed and said skip portions, first means for feeding said wire through said detector and along a predetermined path, a plurality of spaced cutting means positioned along said path, means responsive to said detector for stopping said first means from feeding said wire, further means for feeding said wire a predetermined distance along said path after said first means has stopped feeding, and through said cutting means for centering said formed portion between said cutting means, and means for actuating said plurality of cutting means to cut said wire after said further means for feeding has fed said wire said predetermined distance.

7. In a machine for obtaining formed lengths of wire having centrally located formed portions from a continuous wire having formed and skip portions comprising means for detecting the juncture of said formed and said skip portions, first means for feeding said wire through said detector and along a predetermined path, a plurality of spaced cutting means position along said path, means responsive to said detector for stopping said first means from feeding said wire, further means for feeding said wire a predetermined distance along said path after said first means has stopped feeding, and through said cutting means for centering said formed portion between said cutting means, means for actuating said plurality of cutting means to cut said wire after said further means for feeding has fed said wire said predetermined distance, and means for bending said cut length of wire into V-shape.

8. A wire feeding, cutting and bending means, said wire having points of distinctive characteristics along the length thereof, comprising a motor, power drive means for initiating the feeding of said wire along a path, means independent of said power drive and responsive to a distinctive point on said wire for causing cessation of the feeding of said wire, means positioned along said path for cutting said wire, means driven by said motor for gripping said wire, means driven by said motor for pulling said wire along said path a predetermined distance for centering said wire adjacent said cutting means, means driven by said motor for actuating said cutting means and means driven by said motor for bending said wire.

9. Means for feeding and processing a continuous medium, said continuous medium having first distinctively formed portions and further distinctively formed portions joining said distinctively formed portions, said first distinctively formed portions being of substantially equal length, means for moving said continuous medium along a path, means positioned along said path for processing said medium, means for causing cessation of movement of said medium along said path responsive to the arrival of the juncture of said first distinctively formed portions and said further distinctively formed portions at a predetermined point in said path, means, independent of said means for moving, for further moving said medium a predetermined distance along said path and into registry with said processing means, and means for actuating said processing means for said medium is further moved.

10. Means for feeding and cutting a continuous medium, said continuous medium having first distinctively formed portions and further distinctively formed portions joining said first distinctively formed portions, said first distinctively formed portions being of substantially equal length, means for moving said continuous medium along a path, means for causing cessation of movement of said medium along said path responsive to the arrival of the juncture of said first distinctively formed portions and said further distinctively formed portions at a predetermined point in said path, means for cutting said medium positioned along said path, means for further moving said medium a predetermined distance along said path and into registry with said cutting means, and means for actuating said cutting means after further movement of said medium.

11. Means for feeding and cutting a continuous medium, said continuous medium having first distinctively formed portions and further distinctively formed portions joining said first distinctively formed portions, said first distinctively formed portions being of substantially equal length, means for moving said continuous medium along a path, means for causing cessation of movement of said medium along said path responsive to the arrival of the juncture of said first distinctively formed portions and said further distinctively formed portions at a predetermined point in said path, means for cutting said medium at two points along said path, means for further moving said medium a predetermined distance along said path and into centered relation with respect to said cutting means, and means for actuating said cutting means after said medium has been further moved.

12. Means for feeding and cutting a continuous medium, said continuous medium having first distinctively formed portions and further distinctively formed portions joining said first distinctively formed portions, said first distinctively formed portions being of substantially equal length, means for moving said continuous medium along a path, means for causing cessation of movement of said medium along said path responsive to the arrival of the juncture of said first distinctively formed portions and said further distinctively formed portions at a predetermined point in said path, means for cutting said medium positioned along said path, means for further moving said medium a predetermined distance along said path and into registry with said cutting means, and means for bending said medium.

13. Means for cutting and forming vacuum tube heaters from continuous heater wire comprising successive helical heater wire portions joined by skip wound heater wire portions, said means comprising means for feeding such continuous heater wire along a path and past a point, means at said point to detect the juncture of said helical portions and said skip portions, means responsive to said detecting means to cause cessation of said feeding upon arrival of said juncture at said point, means positioned along said path for cutting said heater wire, means for gripping said heater means, means including said means for said gripping for pulling said heater wire a predetermined distance for centering said wire with respect to said cutting means, means for actuating said cutting means after said heater wire has been pulled said predetermined distance, and means for bending said cut wire into V-shape.

14. Apparatus for cutting and forming individual heater wires from a continuous heater wire wherein helically wound portions of equal length are separated by skip portions, said apparatus including feeding means for feeding said wire along a predetermined path, means for distinguishing said helically wound portions from said skip portions, means adjacent said path and responsive to said distinguishing means for centering a helically wound portion at a given point along said path, means for cutting said skip portions at equal distances from said given point, and means for engaging the cut portion of said heater wire at said given point and at points spaced therefrom for forming the cut heater wire into a nonlinear shape having equal length skip portions on opposite sides of the helically wound portion.

15. Apparatus for cutting and forming individual heater wires from a continuous heater wire wherein helically wound portions of equal length are separated by skip portions, said apparatus including feeding means for feeding said wire along a predetermined path, sensing means adjacent said path and connected to control said feeding means for centering a helically wound portion at a given point, clamping means positioned on opposite sides of said given point along said path for clamping said wire, means for cutting said skip portion at equal distances from said given point, said clamping means being disposed immediately adjacent and operably associated with said cutting means for holding said wire during cutting thereof, and a forming means for engaging the cut portion of said heater wire at said given point and at points spaced therefrom for forming the cut portion of heater wire into a V-shape having equal length skip portions on opposite sides of the coil portions.

16. Apparatus for cutting and forming individual heater wires from a continuous heater wire wherein helically wound portions of equal length are separated by skip portions, said apparatus comprising means for centering a helically wound portion at a given point, means for clamping skip portions of said heater wire on opposite sides of said helically wound portion, means for cutting said skip portions at equal distances from said given point, said clamping means being operably associated with and disposed in close relation with said cutting means for holding said wire during cutting thereof, and means for engaging the helically wound portion at said given point and at points spaced therefrom and forming a cut portion of the heater wire into a V-shape having its apex at said given point and equal skip portions on opposite sides of the helically wound portion.

17. The method of cutting and forming individual heater wires from a continuous heater wire wherein helically wound portions of equal length are separated by skip portions, including the steps of feeding said wire along a predetermined path, sensing a helically wound portion of said wire, centering a helically wound portion at said sensed given point along said path, cutting said skip portions at equal distances from said given point, and engaging the cut portion of said heater wire at said given point and at points spaced therefrom and forming said cut portion into a V-shape having equal length skip portions on opposite sides of the helically wound portions.

18. The method of cutting and forming individual heater wires from a continuous heater wire wherein helically wound portions of equal length are separated by skip portions, including the steps of feeding said wire, sensing a helically wound portion of said wire, centering said sensed helically wound portion at a given point, clamping skip portions of said heater wire on opposite sides of said helically wound portion, cutting said skip portions at equal distances from said given point, and engaging said helically wound portion at said given point and forming the cut portion of said heater wire into a V-shape having its apex at said given point and equal skip portion on opposite sides of said helically wound portion.

19. Apparatus for operating on a continuous medium having randomly spaced article segments disposed along the length thereof, said apparatus comprising means for feeding the leading end of said continuous medium past a point, a detecting means located adjacent said point for detecting a distinguishing characteristic of an article segment on said medium, means responsive to said detecting means for causing cessation of feed of said medium upon detection of said distinguishing characteristic, a processing means spaced from said point, means for grasping said leading end after cessation of feed of said medium for pulling said medium a predetermined distance past said detecting means for centering said detected article segment with respect to said processing means, and means for actuating said processing means after said wire is pulled.

20. Apparatus for operating on a continuous medium having randomly spaced article segments disposed along the length thereof, said apparatus comprising means for feeding the leading end of said continuous medium past a point, a detecting means located adjacent said point for detecting a distinguishing characteristic of an article segment on said medium, means responsive to said detecting means for causing cessation of feed of said medium upon detection of said distinguishing characteristic, a pair of processing means spaced to one side of said point, means for grasping said leading end after cessation of feed of said medium for pulling said medium a predetermined distance past said detecting means for centering said detected article segment between said pair of processing means, and means for actuating said processing means after said wire is pulled.

21. Method of feeding and cutting article segments randomly spaced along a continuous medium comprising feeding said medium past a point until a distinguishing characteristic of one of said article segments along said medium is disposed adjacent said point, further feeding said medium a predetermined distance measured from said point after said distinguishing characteristic has been disposed adjacent said point, and cutting said medium on opposite sides of said article segment at equal distances from the center thereof.

22. Apparatus for cutting and forming individual heater wires from a continuous heater wire wherein helical wound portions of equal length are separated by skip portions, said apparatus including feeding means for feeding said wire along a predetermined path, sensing means adjacent said path, said sensing means including means for blowing air through the path of said wire, said wire passing closely adjacent said blowing means for causing interference with the passage of air therefrom, and means associated with said air blowing means sensitive to the degree of interference with the passage of air, said sensing means being connected to control said feeding means for centering a helical wound portion at a given point, clamping means positioned on opposite sides of said given point along said path for clamping said wire, means for cutting said clamped skip portion at equal distances from said given point, and a forming means for engaging the cut portions of said heater wire at said given point and at points spaced therefrom for forming the cut portions of heater wire into a V-shape having equal length skip portions on opposite sides of said helically wound portion.

References Cited in the file of this patent

UNITED STATES PATENTS

| | | |
|---|---|---|
| 2,107,926 | Asmussen et al. | Feb. 8, 1938 |
| 2,380,320 | La France | July 10, 1945 |
| 2,458,612 | Luzzatto et al. | Jan. 11, 1949 |
| 2,712,835 | Sampatacos et al. | July 12, 1955 |
| 2,844,171 | Kuba et al. | July 22, 1958 |